(12) United States Patent
Lin et al.

(10) Patent No.: US 8,774,775 B2
(45) Date of Patent: Jul. 8, 2014

(54) METHOD AND TERMINAL FOR TALK RECORDING IMPLEMENTATION

(75) Inventors: Xue Lin, Shenzhen (CN); Jun Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 37 days.

(21) Appl. No.: 13/582,551

(22) PCT Filed: Sep. 7, 2010

(86) PCT No.: PCT/CN2010/076679
§ 371 (c)(1),
(2), (4) Date: Sep. 4, 2012

(87) PCT Pub. No.: WO2011/137614
PCT Pub. Date: Nov. 10, 2011

(65) Prior Publication Data
US 2012/0329434 A1   Dec. 27, 2012

(30) Foreign Application Priority Data
May 6, 2010   (CN) .......................... 2010 1 0165773

(51) Int. Cl.
*H04M 3/42*   (2006.01)

(52) U.S. Cl.
USPC ...................................... 455/414.1; 379/1.01

(58) Field of Classification Search
CPC .................. H04L 29/08108; H04M 2207/18; H04W 4/02
USPC ...................................... 455/414.1; 379/1.01
See application file for complete search history.

(56) References Cited

U.S. PATENT DOCUMENTS

| 8,594,278 B2 * | 11/2013 | Pappas et al. ................. 379/1.01 |
| 2007/0008326 A1 | 1/2007 | Levien et al. |
| 2012/0329434 A1 * | 12/2012 | Lin et al. .................... 455/414.1 |

FOREIGN PATENT DOCUMENTS

| CN | 101090328 A | 12/2007 |
| CN | 101184195 A | 5/2008 |
| CN | 101330536 A | 12/2008 |

OTHER PUBLICATIONS

International Search Report from corresponding PCT application PCT/CN2010/076679, mailed Feb. 24, 2011 (with English translation).

* cited by examiner

*Primary Examiner* — William D Cumming
(74) *Attorney, Agent, or Firm* — IPLM Group, P.A.

(57) ABSTRACT

A method for implementing call recording. The method includes establishing an audio signal channel between a master processor and a slave processor of a mobile terminal. The method also includes the slave processor sending the mobile terminal microphone's sidetone signal and headphone signal through the established audio signal channel. The master processor receiving and recording said sidetone signal and headphone signal. A terminal for implementing call recording. The master processor can record the slave processor's sidetone signal and headphone signal in real time.

6 Claims, 2 Drawing Sheets

METHOD AND TERMINAL FOR TALK RECORDING IMPLEMENTATION

TECHNICAL FIELD

The present invention relates to the field of call recording, and more especially, to a method and terminal for implementing call recording in a mobile terminal.

BACKGROUND OF THE RELATED ART

The dual-mode dual-standby mobile phone is also known as the dual-network dual-standby phone, which combines the Code Division Multiple Access (CDMA) network and the Global System for Mobile Communication (GSM) network. Typically, one dual-mode dual-standby mobile phone can be inserted simultaneously with two cards from different networks, and both cards are activated at the same time, and the user can make a call, answer a call, and send and receive the SMS (Small Message) without switching the networks, moreover, such dual-mode dual-standby mobile phone can support a variety of value-added services to enable the business people enjoy the freedom of the mobile office and the fun of the rest and entertainment. In addition, the user can preset the order of incoming and outgoing calls, thus the use is very convenient.

For the communication systems, the dual-mode dual-standby online phone is a dual-network dual-standby mobile phone. At present, the mobile communication network mainly has two modes: one is the GSM network, and the other is the CDMA network, and the dual-network due-standby mobile phone can resolve the problem that one phone cannot enjoy two networks at the same time. The biggest feature of the dual-network dual-standby mobile phone is: it can ensure that the mobile phone cards of the two networks, CDMA and GSM, can work in the same phone at the same time to truly achieve the free connection of the two networks, to reach the world advanced level of the dual-mode communication technology. Based on these advantages, using the dual-mode duel-standby function to attract the user groups becomes a strategy of the operator and has a wide range of applications.

The basic framework of the dual-mode dual-standby mobile phone is already relatively mature, FIG. 1 is a basic structure diagram of the dual-mode dual-standby mobile phone in the prior art. As shown in FIG. 1, the basic framework of the dual-mode dual-standby mobile phone uses the master-slave architecture form, and the signals from the microphone, the handset and the headset can switch between the two processors, the master and slave processors, through the analog switch. Based on this architecture, some functions have very high requirements on the design, for example: the call recording function. The channels of the handset and microphone are switched through the switch, when the call is from the slave processor side, the microphone and handset are directly connected with the slave processor, and the master processor cannot directly obtain the audio signal, and vice versa. That is, for a mobile phone based on this dual-mode dual-standby architecture, the call recordings of the master slave processors can only be performed through their respective processors, however, the playback of the recording is completed through the control of the master processor, therefore, how the master processor obtains and plays the slave processor's recording file would be a problem.

At present, in order to resolve the problem of the master processor obtaining and playing the slave processor's recording file, a viable implementation method is: after the slave processor completes the recording alone, it transmits the recording to the master processor through the data channel, and the master processor plays the recording. Here, the data channel transmits the digital signal, and the data channel is usually a serial port or a USB port; moreover, the data transmitted by the data channel can only be transmitted properly through the software control as well as the appropriate protocol. However, since on the one hand, the recording formats of the master and slave processors are different, the master processor is not able to directly play the slave processor's recording file; on the other hand, the data amount of the call recording is relatively large, the data transmission will affect the system operating efficiency, therefore, the call recording implementation method of the dual-mode dual-standby mobile phone should be improved.

SUMMARY OF THE INVENTION

In view of this, the main purpose of the present invention is to provide a method and terminal for implementing call recording to achieve a master processor recording a slave processor's sidetone signal and handset signal in real time.

To achieve the aforementioned purpose, the technical solution of the present invention is accomplished as follows.

The present invention provides a method for implementing call recording, wherein, an audio signal channel is established between a master processor and a slave processor of a mobile terminal; the method also comprises:

the slave processor sending a microphone's sidetone signal and handset signal of the mobile terminal through the established audio signal channel;

the master processor receiving the sidetone signal and the handset signal and recording.

In the aforementioned method, said establishing the audio signal channel between the master processor and the slave processor of the mobile terminal is specifically:

the mobile terminal's master handset being connected directly with the master processor's multi-channel switch, and the mobile terminal's headset being connected with the master processor's multi-channel switch;

the slave processor's first output port being connected with the master processor's first audio input port to form a first audio signal channel; the slave processor's second output port being connected with the master processor's second audio input port, and the second audio input port being connected with the master processor's multi-channel switch to form a second audio signal channel.

In the aforementioned method, the slave processor sending a microphone's sidetone signal and handset signal of the mobile terminal through the established audio signal channel is specifically:

using an analog switch to control the microphone connect with the slave processor, and the slave processor controlling the microphone's sidetone signal output from the first output port or the second output port; the slave processor outputting the handset signal through the second output port.

In the aforementioned method, the main processor receiving the sidetone signal and the handset signal is specifically:

the master processor receiving the microphone's sidetone signal from the first audio input port through the first audio signal channel, and receiving the handset signal from said second audio input port through the second audio signal channel.

The present invention also provides a terminal for implementing call recording, comprising: an establishment module, a master processor, and a slave processor; wherein, the establishment module is configured to establish an audio signal channel between the master processor and the slave processor of the mobile terminal;

the main processor is configured to receive the mobile terminal microphone's sidetone signal and handset signal sent from the slave processor through the audio signal channel and record;

the slave processor is configured to send the mobile terminal microphone's sidetone signal and handset signal to the master processor through the audio signal channel established by the establishment module.

In the aforementioned terminal, the master processor further comprises:

a recording module, which is configured to record the received sidetone signal and handset signal.

In the aforementioned terminal, the audio signal channel is specifically:

an audio signal channel is configured to send the slave processor's sidetone signal to the master processor, and another audio signal channel is configured to send the slave processor's handset signal to the master processor.

In the method and terminal for implementing call recording provided in the present invention, an audio signal channel is established between the master and slave processors, and both ends of the channel are ordinary audio input and output ports, the channel can be used by the slave processor to transmit the analog audio signal to the master processor in real time, and without additional data transmission, management and control, it can reduce the data amount transmitted per unit time between the master and slave processors. Moreover, it is the real-time audio signal transmitted in the audio signal channel in the present invention, unlike the prior art, which needs the guarantee through software control and the corresponding protocol, it only needs the software switches the channel correctly, and the implementation is simple and convenient.

In the present invention, when the call is from the slave processor side, the slave processor is in the high-speed running state, the master processor is not running at full speed, and the system resources have redundancy, therefore, the call recording from the slave processor side is transferred to the master processor to complete, this is benefit to balance the system resources, to reduce the system overhead of the slave processor, therefore, the advantages of the master processor can be fully played and no great deal of system burden would be brought to the master processor.

The call recording at the slave processor side is completed by the master processor, the master processor can uniformly complete three ways of recording: the local recording, the master processor's call recording, and the slave processor's call recording, to effectively ensure the compatibility of the recording file formats, moreover, managing and playing the recording file are also very convenient.

PREFERRED EMBODIMENTS OF THE PRESENT INVENTION

The basic idea of the method for implementing the call recording provided in the present invention is: establishing an audio signal channel between the master and slave processors of the mobile terminal; the method also comprises: the slave processor sends the mobile terminal microphone's sidetone signal and handset signal through the established audio signal channel; the master processor receives and records the sidetone signal and the handset signal.

In the following, the present invention is described in further detail with combination of the accompanying drawings and specific embodiments.

Figure 1:
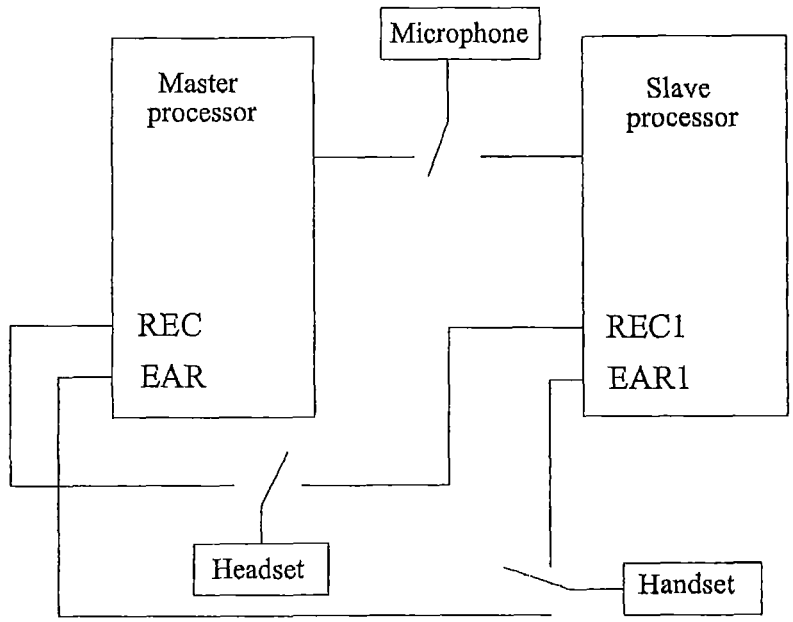
FIG. 1 is a basic structure diagram of a dual-mode dual-standby mobile phone in the prior art.
Figure 2:
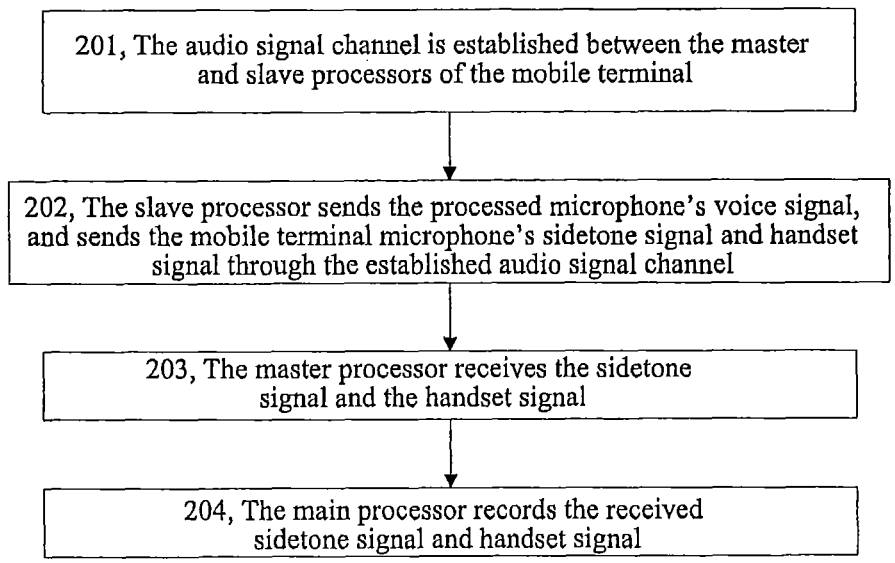
FIG. 2 is a flow chart of a method for implementing the call recording in accordance with the present invention.

FIG. 2 is a flow chart of the method for implementing the call recording in accordance with the present invention, as shown in FIG. 2, the method for implementing the call recording in accordance with the present invention comprises the following steps.

Step 201, the audio signal channel is established between the master and slave processors of the mobile terminal.

Figure 3:
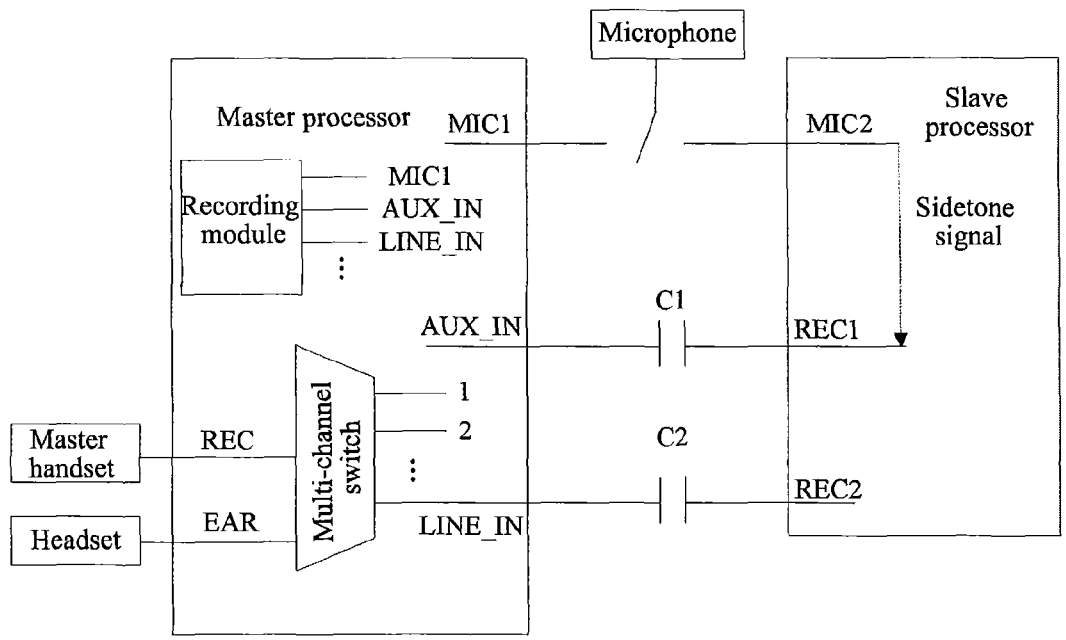
FIG. 3 is a structure diagram of the method for implementing the call recording in accordance with the present invention.

Specifically, the architecture of the existing dual-mode dual-standby mobile phone is adjusted and the audio signal channel is established. As shown in FIG. 3, the output of the master handset is not switched through the analog switch, but the master handset is directly connected with the master processor's multi-channel switch. Similarly, the headphone output is not switched through the analog switch, but the headphone is connected with the master processor's multi-channel switch, and both the master handset and the headset are not directly connected with the slave processor. The slave processor's first output port REC1 is connected with the master processor's first audio input port AUX-IN to form the first audio signal channel, the second output REC2 is connected with the master processor's second audio input port LINE-IN, the second audio input port LINE-IN is connected with the master processor's multi-channel switch to form the second audio signal channel, the master handset and the headset are connected with the second output port REC2 through the second audio input port LINE-IN via the multi-channel switch, that is, the master handset and the headset share the second output port REC2 to indirectly connect with the slave processor; the capacitors C1 and C2 in the two audio signal channels are non-mandatory devices, the choice of the devices is determined by the characteristics of the master processor's audio input port; the first output port REC1, the second output port REC2, the first audio input port AUX-IN and the second audio input port LINE-IN are common audio input and output ports.

Step 202, the slave processor sends the processed microphone's voice signal, and sends the mobile terminal microphone's sidetone signal and handset signal through the established audio signal channel.

Specifically, the microphone's sidetone is the essential function of the mobile terminal. In the practical applications, the local microphone voice signal is processed and sent out through the air, and at the same time, a part of the voice signal is sent back to the local handset to make the caller can hear his/her own voice, thus increasing the fidelity of the voice, the returned-back part of the voice signal is called sidetone. The handset signal is the voice signal output through the handset in a call, is the voice signal, which the call party at the handset side can hear, of the other party, and the handset signal is received by the mobile terminal from the base station through the wireless communication method.

The slave processor processes the microphone's voice signal, that is: the slave processor performs digital to analog conversion and filtering of the microphone's voice signal, and sends the processed microphone's voice signal to the base station via the modem through the wireless communication method, and then the base station sends the signal to the other party in the call through the wireless communication method.

As shown in FIG. 3, when the call is made at the slave processor side, the analog switch is used to control the microphone connect with the slave processor, and the slave processor controls the microphone's sidetone output from the first output port REC1 or the second output port REC2. The sidetone in this embodiment is output from the first output port REC1. Meanwhile, the slave processor's handset signal is output through the second output port REC. Both the sidetone signal and the handset signal are analog signals, that is, the sidetone signal and the handset signal are output from the slave processor in the form of the analog audio signal. One end of the analog switch has a public port connecting with the microphone, and the other end of the analog switch is controlled through the control interface to switch between the master and slave processors, that is, it implements that the microphone connects with the master processor or the microphone connects with the slave processor; in the practical applications, the control interface is controlled by the master processor.

Step 203, the master processor receives the sidetone signal and the handset signal.

Specifically, the master processor receives the microphone's sidetone signal through the first audio input port AUX_IN at the master processor side in the first audio signal channel, and receives the handset signal through the second audio input port LINE_IN at the master processor side in the second audio signal channel.

Step 204, the main processor records the received sidetone signal and handset signal.

Specifically, after the master processor receives the sidetone signal and the handset signal, it uses the recording module in the master processor to record the received signal.

Figure 4:
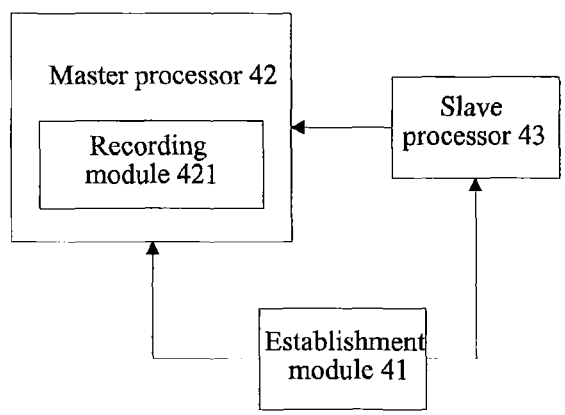
FIG. 4 is a schematic diagram of a terminal for implementing the call recording in accordance with the present invention.

In order to achieve the aforementioned method, the present invention also provides a terminal for implementing call recording, as shown in FIG. 4, the system comprises: the establishment module 41, the master processor 42, and the slave processor 43.

The establishment module 41 is used to establish an audio signal channel between the master processor 42 and the slave processor 43 of the mobile terminal. Generally, two audio signal channels might be established, one audio signal channel is used to transmit the slave processor's sidetone signal to the master processor, and the other audio signal channel is used to transmit the slave processor's handset signal to the master processor.

The main processor 42 is used to receive and record the mobile terminal microphone's sidetone signal and handset signal from the slave processor 43 through the audio signal channel.

The slave processor 43 is used to send the mobile terminal microphone's sidetone signal and handset signal to the master processor 42 through the audio signal channel established by the establishment module 41.

The main processor 42 further comprises: the recording module 421, which is used to record the received side-tone signal and handset signal.

The above description is only the preferred embodiments of the present invention and is not intended to limit the protection scope of the present invention, any changes, equivalent replacements and improvements made within the spirits and principles of the present invention shall be included within the protection scope of the present invention.

What is claimed is:

1. A method for implementing call recording, wherein, an audio signal channel is established between a master processor and a slave processor of a mobile terminal; the method also comprises:
    the slave processor sending a microphone's sidetone signal and handset signal of the mobile terminal through the established audio signal channel;
    the master processor receiving the sidetone signal and the handset signal and recording;
    wherein said establishing the audio signal channel between the master processor and the slave processor of the mobile terminal is specifically:
    the mobile terminal's master handset being connected directly with the master processor's multi-channel switch, and the mobile terminal's headset being connected with the master processor's multi-channel switch;
    the slave processor's first output port being connected with the master processor's first audio input port to form a first audio signal channel; the slave processor's second output port being connected with the master processor's second audio input port, and the second audio input port being connected with the master processor's multi-channel switch to form a second audio signal channel.

2. The method of claim 1, the slave processor sending a microphone's sidetone signal and handset signal of the mobile terminal through the established audio signal channel is specifically:
    using an analog switch to control the microphone connect with the slave processor, and the slave processor controlling the microphone's sidetone signal output from the first output port or the second output port; the slave processor outputting the handset signal through the second output port.

3. The method of claim 1, wherein, the main processor receiving the sidetone signal and the handset signal is specifically:
    the master processor receiving the microphone's sidetone signal from the first audio input port through the first audio signal channel, and receiving the handset signal from said second audio input port through the second audio signal channel.

4. A terminal for implementing call recording, wherein, the terminal comprises: an establishment module, a master processor, and a slave processor; wherein,
    the establishment module is configured to establish an audio signal channel between the master processor and the slave processor of the mobile terminal;
    the main processor is configured to receive the mobile terminal microphone's sidetone signal and handset signal sent from the slave processor through the audio signal channel and record;
    the slave processor is configured to send the mobile terminal microphone's sidetone signal and handset signal to the master processor through the audio signal channel established by the establishment module;
    wherein the audio signal channel is specifically:
    an audio signal channel is configured to send the slave processor's sidetone signal to the master processor, and another audio signal channel is configured to send the slave processor's handset signal to the master processor.

5. The terminal of claim 4, wherein, the master processor further comprises:
    a recording module, which is configured to record the received sidetone signal and handset signal.

6. The terminal of claim 5, wherein, the audio signal channel is specifically:
an audio signal channel is configured to send the slave processor's sidetone signal to the master processor, and another audio signal channel is configured to send the slave processor's handset signal to the master processor.

\* \* \* \* \*